(12) United States Patent
Shaffer et al.

(10) Patent No.: US 9,055,191 B1
(45) Date of Patent: Jun. 9, 2015

(54) SYNCHRONOUS COMMUNICATION

(71) Applicant: Google Inc., Mountain View, CA (US)

(72) Inventors: Daniel Shaffer, Palo Alto, CA (US); Samuel R. D'Amico, Stanford, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/105,785

(22) Filed: Dec. 13, 2013

(51) Int. Cl.
*H04N 7/15* (2006.01)

(52) U.S. Cl.
CPC ....................................... *H04N 7/15* (2013.01)

(58) Field of Classification Search
CPC ...................................................... H04N 7/15
USPC .......... 382/305; 705/14.51, 14.55; 348/14.02; 706/16; 725/46; 455/457; 709/224, 709/227; 713/320; 715/753
See application file for complete search history.

(56) References Cited

U.S. PATENT DOCUMENTS

| | | | |
|---|---|---|---|
| 6,711,586 B1 * | 3/2004 | Wells ..................................... 1/1 |
| 7,366,682 B1 * | 4/2008 | Katiyar et al. ............. 705/14.51 |
| 7,698,238 B2 * | 4/2010 | Barletta et al. .................. 706/16 |
| 8,416,715 B2 | 4/2013 | Rosenfeld et al. |
| 2009/0132368 A1 * | 5/2009 | Cotter et al. ..................... 705/14 |
| 2011/0093898 A1 * | 4/2011 | Rosenthol et al. .............. 725/46 |
| 2012/0008876 A1 * | 1/2012 | Poetker et al. ................ 382/305 |
| 2012/0293606 A1 | 11/2012 | Watson et al. |

FOREIGN PATENT DOCUMENTS

| | | |
|---|---|---|
| WO | 2012094042 A1 | 7/2012 |
| WO | 2013033842 A1 | 3/2013 |

OTHER PUBLICATIONS

Stiefelhagen, et al., "Estimating Focus of Attention Based on Gaze and Sound", PUI 2001, Orlando, Florida, (pp. 1-9).

* cited by examiner

*Primary Examiner* — Gerald Gauthier
(74) *Attorney, Agent, or Firm* — Remarck Law Group PLC (57) ABSTRACT

A method and computing system for providing, using one or more computing devices, a synchronous communication session for a plurality of users. A first video stream associated with the synchronous communication session is provided to a first imaging device associated with the synchronous communication session. A level of interest of the plurality of users in the first video stream provided to the first imaging device is determined. In response to a low level of interest of the plurality of users, a second video stream associated with the synchronous communication session is provided to the first imaging device associated with the synchronous communication session.

23 Claims, 5 Drawing Sheets

SYNCHRONOUS COMMUNICATION

BACKGROUND

The Internet currently allows for the free exchange of ideas and information in a manner that was unimaginable only a couple of decades ago. One such use for the Internet is as a communication medium, whether it is via one-on-one exchanges or multi-party exchanges within social networks.

For example, the Internet enables various parties to participate in video conferences, which are multiuser video chat rooms that allow for virtual gatherings of people so that they may chat about various topics. Within such video conferences, it is oftentimes difficult to determine what particular party or document should be the focal point of the video conference, as many times the party that is speaking is not the party that is the most interesting to watch.

SUMMARY OF DISCLOSURE

In one implementation, a computer-implemented method includes providing, using one or more computing devices, a synchronous communication session for a plurality of users. A first video stream associated with the synchronous communication session is provided to a first imaging device associated with the synchronous communication session. The first imaging device is positioned proximate a first camera and at least one additional camera is positioned away from the first imaging device. A level of interest of the plurality of users in the first video stream provided to the first imaging device is determined. Determining the level of interest includes processing a first image from the first camera to determine whether a portion of the plurality of users are watching the first video stream provided to the first imaging device, and processing at least one additional image from the at least one additional camera to determine whether a portion of the plurality of users are watching imagery proximate the at least one additional camera. In response to a low level of interest of the plurality of users, a second video stream associated with the synchronous communication session is provided to the first imaging device associated with the synchronous communication session.

In another implementation, a computer-implemented method includes providing, using one or more computing devices, a synchronous communication session for a plurality of users. A first video stream associated with the synchronous communication session is provided to a first imaging device associated with the synchronous communication session. A level of interest of the plurality of users in the first video stream provided to the first imaging device is determined. In response to a low level of interest of the plurality of users, a second video stream associated with the synchronous communication session is provided to the first imaging device associated with the synchronous communication session.

One or more of the following features may be included. The first imaging device may be a local video conference monitor. The first imaging device may be a remote computing device. The first video stream and the second video stream may be broadcast to the first imaging device.

The first imaging device may be positioned proximate a first camera. Determining a level of interest of the plurality of users in the first video stream provided to the first imaging device may include processing a first image from the first camera to determine whether a portion of the plurality of users are watching the first video stream provided to the first imaging device.

At least one additional camera may be positioned away from the first imaging device. Determining a level of interest of the plurality of users in the first video stream provided to the first imaging device may include processing at least one additional image from the at least one additional camera to determine whether a portion of the plurality of users are watching imagery proximate the at least one additional camera.

At least one additional video stream associated with the synchronous communication session may be provided to at least one additional imaging device associated with the synchronous communication session. The at least one additional camera may be positioned proximate the at least one additional imaging device. The imagery proximate the at least one additional camera may include the at least one additional video stream provided to the at least one additional imaging device. The at least one additional camera may be positioned proximate one or more of the plurality of users. The imagery proximate the at least one additional camera may include imagery associated with the one or more of the plurality of users.

In another implementation, a computing system including a processor and memory is configured to perform operations including providing, using one or more computing devices, a synchronous communication session for a plurality of users. A first video stream associated with the synchronous communication session is provided to a first imaging device associated with the synchronous communication session. A level of interest of the plurality of users in the first video stream provided to the first imaging device is determined. In response to a low level of interest of the plurality of users, a second video stream associated with the synchronous communication session is provided to the first imaging device associated with the synchronous communication session.

One or more of the following features may be included. The first imaging device may be a local video conference monitor. The first imaging device may be a remote computing device. The first video stream and the second video stream may be broadcast to the first imaging device.

The first imaging device may be positioned proximate a first camera. Determining a level of interest of the plurality of users in the first video stream provided to the first imaging device may include processing a first image from the first camera to determine whether a portion of the plurality of users are watching the first video stream provided to the first imaging device.

At least one additional camera may be positioned away from the first imaging device. Determining a level of interest of the plurality of users in the first video stream provided to the first imaging device may include processing at least one additional image from the at least one additional camera to determine whether a portion of the plurality of users are watching imagery proximate the at least one additional camera.

At least one additional video stream associated with the synchronous communication session may be provided to at least one additional imaging device associated with the synchronous communication session. The at least one additional camera may be positioned proximate the at least one additional imaging device. The imagery proximate the at least one additional camera may include the at least one additional video stream provided to the at least one additional imaging device. The at least one additional camera may be positioned proximate one or more of the plurality of users. The imagery proximate the at least one additional camera may include imagery associated with the one or more of the plurality of users.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
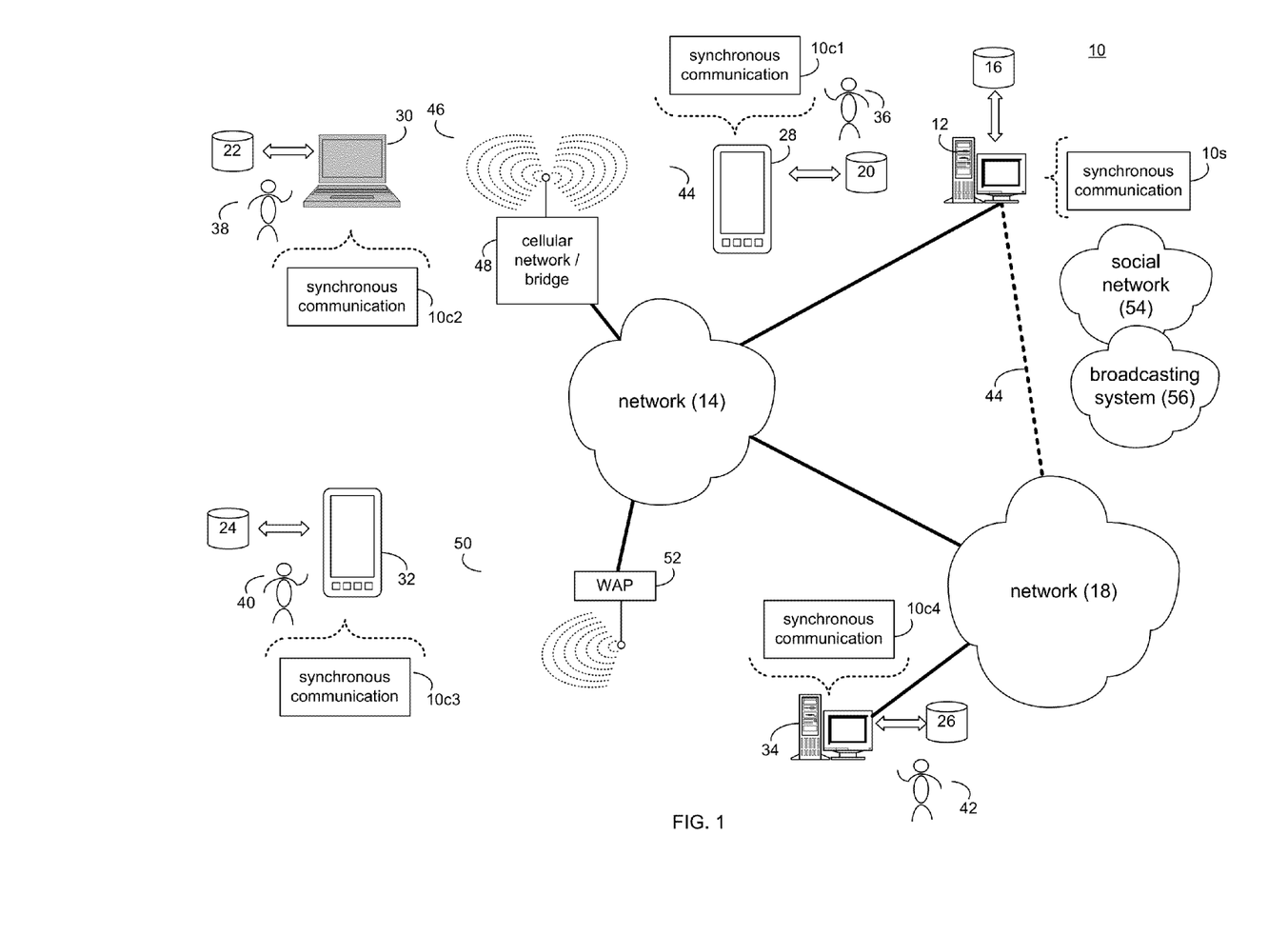
FIG. 1 is a diagrammatic view of a distributed computing network including a computing device that executes a synchronous communication process according to an embodiment of the present disclosure.
Figure 2:
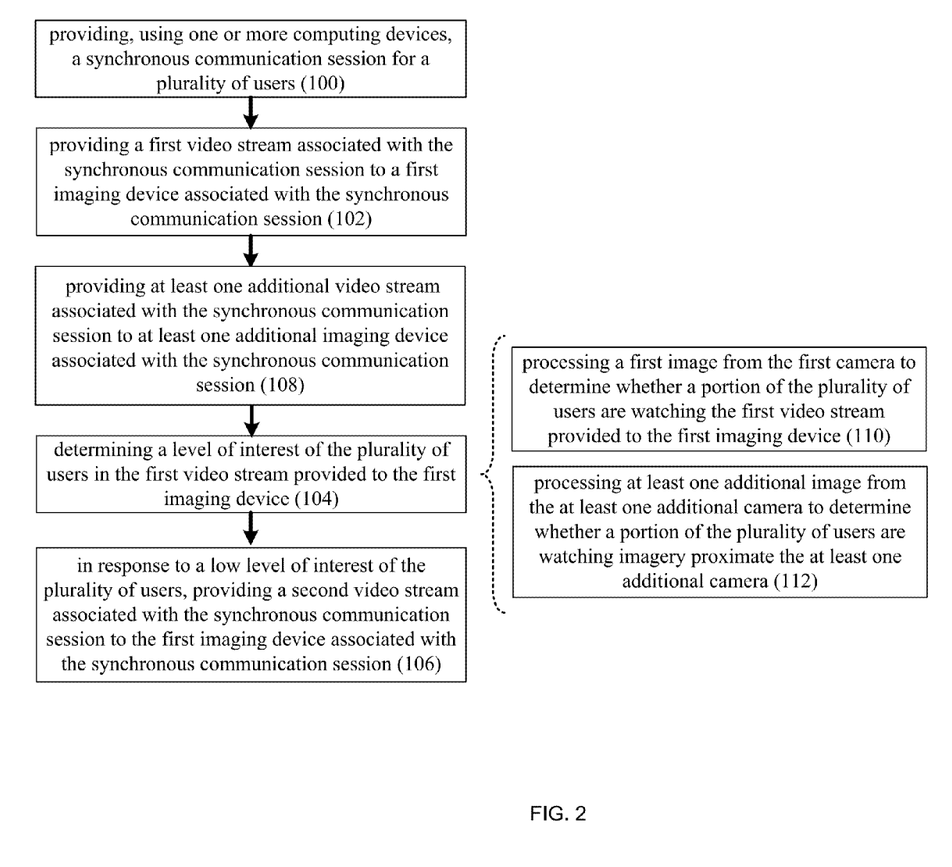
FIG. 2 is a flowchart of the synchronous communication process of FIG. 1 according to an embodiment of the present disclosure.

In FIGS. 1 & 2, there is shown synchronous communication process 10. Synchronous communication process 10 may be implemented as a server-side process, a client-side process, or a hybrid server-side/client-side process. For example, synchronous communication process 10 may be implemented as a purely server-side process via synchronous communication process 10s. Alternatively, synchronous communication process 10 may be implemented as a purely client-side process via one or more of synchronous communication process 10c1, synchronous communication process 10c2, synchronous communication process 10c3, and synchronous communication process 10c4. Alternatively still, synchronous communication process 10 may be implemented as a hybrid server-side/client-side process via synchronous communication process 10s in combination with one or more of synchronous communication process 10c1, synchronous communication process 10c2, synchronous communication process 10c3, and synchronous communication process 10c4. Accordingly, synchronous communication process 10 as used in this disclosure may include any combination of synchronous communication process 10s, synchronous communication process 10c1, synchronous communication process 10c2, synchronous communication process 10c3, and synchronous communication process 10c4.

As will be discussed below in greater detail, synchronous communication process 10 may provide 100 a synchronous communication session for a plurality of users. A first video stream associated with the synchronous communication session may be provided 102 to a first imaging device (e.g., a local video conference monitor) associated with the synchronous communication session. Synchronous communication process 10 may determine 104 a level of interest of the plurality of users in the first video stream provided to the first imaging device. In response to a low level of interest of the plurality of users, synchronous communication process 10 may provide 106 a second video stream associated with the synchronous communication session to the first imaging device associated with the synchronous communication session.

Synchronous communication process 10s may be a server application and may reside on and may be executed by computing device 12, which may be connected to network 14 (e.g., the Internet or a local area network). Examples of computing device 12 may include, but are not limited to: a personal computer, a laptop computer, a tablet computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of synchronous communication process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of synchronous communication processes 10c1, 10c2, 10c3, 10c4 may include but are not limited to a web browser, a game console user interface, a social network user interface, or a specialized application. The instruction sets and subroutines of synchronous communication processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a tablet computer (not shown), a notebook computer (not shown), a server computer (not shown), a smart television (not shown), a gaming console (not shown), and a dedicated network device (not shown). Client electronic devices 28, 30, 32, 34 may each execute an operating system.

Users 36, 38, 40, 42 may access synchronous communication process 10 directly through network 14 or through secondary network 18. Further, synchronous communication process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As is known in the art, users of social networks (e.g., social network 54) may be able to participate in group communication sessions, such as synchronous communication sessions (e.g., video conferences) that may allow for virtual gatherings of people so that they may chat about various topics.

Synchronous communication process 10 may be included within, executed within, or a portion of social network 54. Alternatively, synchronous communication process 10 may be included within, executed within, or a portion of Internet-based broadcasting system 56. Further, synchronous communication process 10 may be a stand-alone application that may be configured to host synchronous communication sessions (e.g., video conferences). Alternatively, synchronous communication process 10 may be a stand-alone application that may be configured to interface with social network 54 and/or Internet-based broadcasting system 56, enabling social network 54 and/or Internet-based broadcasting system 56 to host synchronous communication sessions (e.g., video conferences). Additionally, Internet-based broadcasting system 56 may be included within, executed within, or a portion of social network 54.

Figure 3:
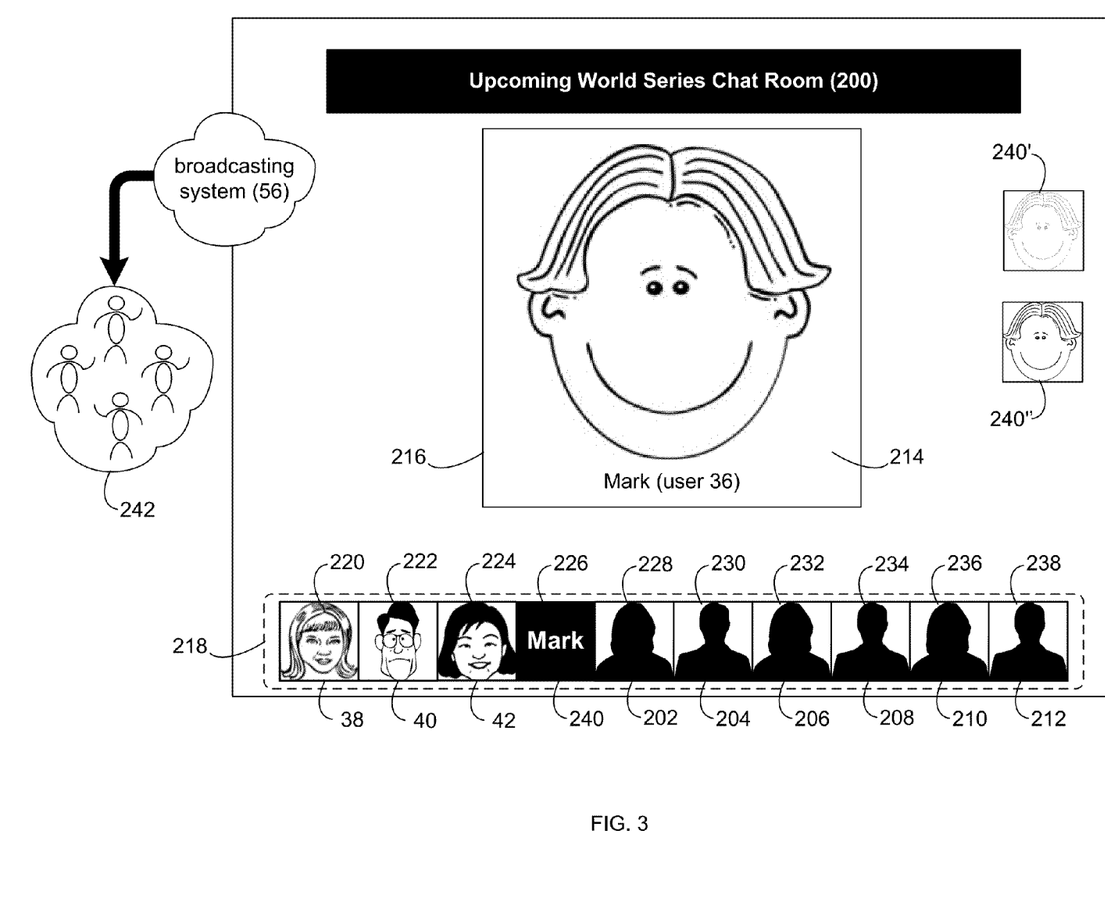
FIG. 3 is a diagrammatic view of a display screen rendered by the synchronous communication process of FIG. 1 according to an embodiment of the present disclosure.

Referring also to FIG. 3, assume for illustrative purposes that user 36 (i.e. Mark) is mid-level manager within a tech company and that Mary (user 38), Joe (user 40), and Cindy (user 42) are members of Mark's team. Further assume for illustrative purposes that users 36, 38, 40, 42 wish to participate in synchronous communication session 200 so that they may provide updates concerning their latest development project to management (e.g., users 202, 204, 206, 208, 210, 212). Accordingly and for this illustrative example, assume that user 36 utilizes synchronous communication process 10 to effectuate synchronous communication session 200.

For this example, assume that users 202, 204, 206, 208, 210, 212 (e.g., management) are located in the corporate office of the tech company and that users 36, 38, 40, 42 are travelling and will attend synchronous communication session 200 using their client electronic devices, namely data-enabled, cellular telephone 28, laptop computer 30, personal digital assistant 32, and personal computer 34 (respectively).

While the following discussion concerns synchronous communication session 200 being an audio-video, synchronous communication session, this is for illustrative purposes only and is not intended to be a limitation of this disclosure, as other configurations are possible (e.g., a multi-user, video conference that includes one or more audio-only participants) and are considered to be within the scope of this disclosure.

Synchronous communication process 10 may be configured to provide visual prominence to the user that is currently speaking within synchronous communication session 200. Assume for illustrative purposes that when synchronous communication session 200 is started, user 36 may lead off the discussion concerning their latest development project. Accordingly, synchronous communication process 10 may provide visual prominence to user 36, as user 36 is currently addressing the remaining users (e.g., users 38, 40, 42, 202, 204, 206, 208, 210, 212) of the plurality of users within synchronous communication session 200. Therefore, synchronous communication process 10 may render a first video stream (e.g., video stream 214) of a first user (e.g., user 36) of the plurality of users (e.g., users 36, 38, 40, 42, 202, 204, 206, 208, 210, 212) within a primary viewing field (e.g., primary viewing field 216) associated with synchronous communication session 200.

Synchronous communication session 200 may include secondary viewing field 218 associated with synchronous communication session 200, which may include a plurality of portions (e.g., one for each of the participants of synchronous communication session 200). While in this particular example, secondary viewing field 218 is shown to include ten portions (namely portions 220, 222, 224, 226, 228, 230, 232, 234, 236, 238), this is for illustrative purposes only and is not intended to be a limitation of this disclosure, as other configurations are possible and are considered to be within the scope of this disclosure. Specifically, the quantity of portions included within secondary viewing field 218 may be increased/decreased depending upon the number of users participating in synchronous communication session 200.

Since synchronous communication process 10 may provide visual prominence to the user that is currently addressing the remaining users within synchronous communication session 200, primary viewing field 216 may be larger than each of the plurality of portions (namely portions 220, 222, 224, 226, 228, 230, 232, 234, 236, 238) included within the secondary viewing field 218.

Synchronous communication process 10 may render a placeholder (e.g., placeholder 240) for the first user (e.g., user 36 who is currently speaking) of the plurality of users (e.g., users 36, 38, 40, 42, 202, 204, 206, 208, 210, 212) within a first portion (e.g., portion 226) of secondary viewing field 218.

Placeholder 240 for the first user (e.g., user 36) of the plurality of users (e.g., users 36, 38, 40, 42, 202, 204, 206, 208, 210, 212) may include information concerning the first user (e.g., user 36), that is the user who is currently speaking. Examples of such information may include but is not limited to one or more of: identification information for the first user (e.g., user 36), such as name and title; and/or contact information for the first user (e.g., user 36), such as an email address, a mailing address, a home phone number, an office phone number, a cell phone number, a social network user name, or a webpage.

Alternatively, placeholder 240 for the first user (e.g., user 36) of the plurality of users (e.g., users 36, 38, 40, 42, 202, 204, 206, 208, 210, 212) may include a partially-obscured, reduced-scale version of the video stream (e.g., video stream 214) of the first user (e.g., user 36). An example of such a partially-obscured, reduced-scale version of the video stream (e.g., video stream 214) of user 36 may include but is not limited to a grayed-out version (e.g., alternate placeholder 240') of the video stream (e.g., video stream 214).

Alternatively still, placeholder 240 for the first user (e.g., user 36) of the plurality of users (e.g., users 36, 38, 40, 42, 202, 204, 206, 208, 210, 212) may include a reduced-scale version of the video stream (e.g., video stream 214) of the first user (e.g., user 36). An example of such a reduced-scale version of the video stream (e.g., video stream 214) of user 36 may include but is not limited to a smaller version (e.g., alternate placeholder 240") of the video stream (e.g., video stream 214).

Further, synchronous communication process 10 may render a video stream of the remaining users of the plurality of users (e.g., users 38, 40, 42, 202, 204, 206, 208, 210, 212) within the remaining portions of secondary viewing field 218. Specifically: a video stream for user 38 may be rendered within portion 220 of secondary viewing field 218; a video stream for user 40 may be rendered within portion 222 of secondary viewing field 218; a video stream for user 42 may be rendered within portion 224 of secondary viewing field 218; a video stream for user 202 may be rendered within portion 228 of secondary viewing field 218; a video stream for user 204 may be rendered within portion 230 of secondary viewing field 218; a video stream for user 206 may be rendered within portion 232 of secondary viewing field 218; a video stream for user 208 may be rendered within portion 234 of secondary viewing field 218; a video stream for user 210 may be rendered within portion 236 of secondary viewing field 218; and a video stream for user 212 may be rendered within portion 238 of secondary viewing field 218.

As discussed above and in this example, a plurality of users (e.g., users 36, 38, 40, 42, 202, 204, 206, 208, 210, 212) may participate within synchronous communication session 200, wherein a video stream associated with each of these users may be rendered (by synchronous communication process 10) within either (in this example) primary viewing field 216 or the various portions (e.g., portions 220, 222, 224, 226, 228, 230, 232, 234, 236, 238) included within secondary viewing field 218.

Additionally, synchronous communication process 10 and/or Internet-based broadcasting system 56 may broadcast the video feed visible within primary viewing field 216 to plurality of broadcast recipients 242. Alternatively, synchronous communication process 10 and/or Internet-based broadcasting system 56 may broadcast all of the video feeds visible within primary viewing field 216 and the secondary viewing field 218 (or any portion thereof) to plurality of broadcast recipients 242. Through the use of such Internet broadcasting, the content of synchronous communication session 200 may be provided to a much greater number of people than e.g., the ten participants of synchronous communication session 200. Accordingly, synchronous communication session 200 may be broadcast to e.g., a division of the tech company, all employees of the tech company, or all shareholders of the tech company.

As discussed above, synchronous communication process 10 may provide visual prominence to user 36 while user 36 is addressing the remaining users (e.g., users 38, 40, 42, 202, 204, 206, 208, 210, 212) of synchronous communication session 200. Further, whenever one of the other users (e.g., users 38, 40, 42, 202, 204, 206, 208, 210, 212) speaks within synchronous communication session 200, synchronous communication process 10 may be configured to automatically position the video stream associated with the speaking user within primary viewing field 216.

However, it is possible that the users of synchronous communication session 200 (e.g., users 38, 40, 42, 202, 204, 206, 208, 210, 212) may not be particularly interested in the speaker (e.g., user 36) that is currently addressing the users (and broadcast recipients) of synchronous communication session 200. Accordingly, synchronous communication process 10 may be configured to gauge the interest that the various users of synchronous communication process 10 have in the person that is currently speaking.

Figure 4:
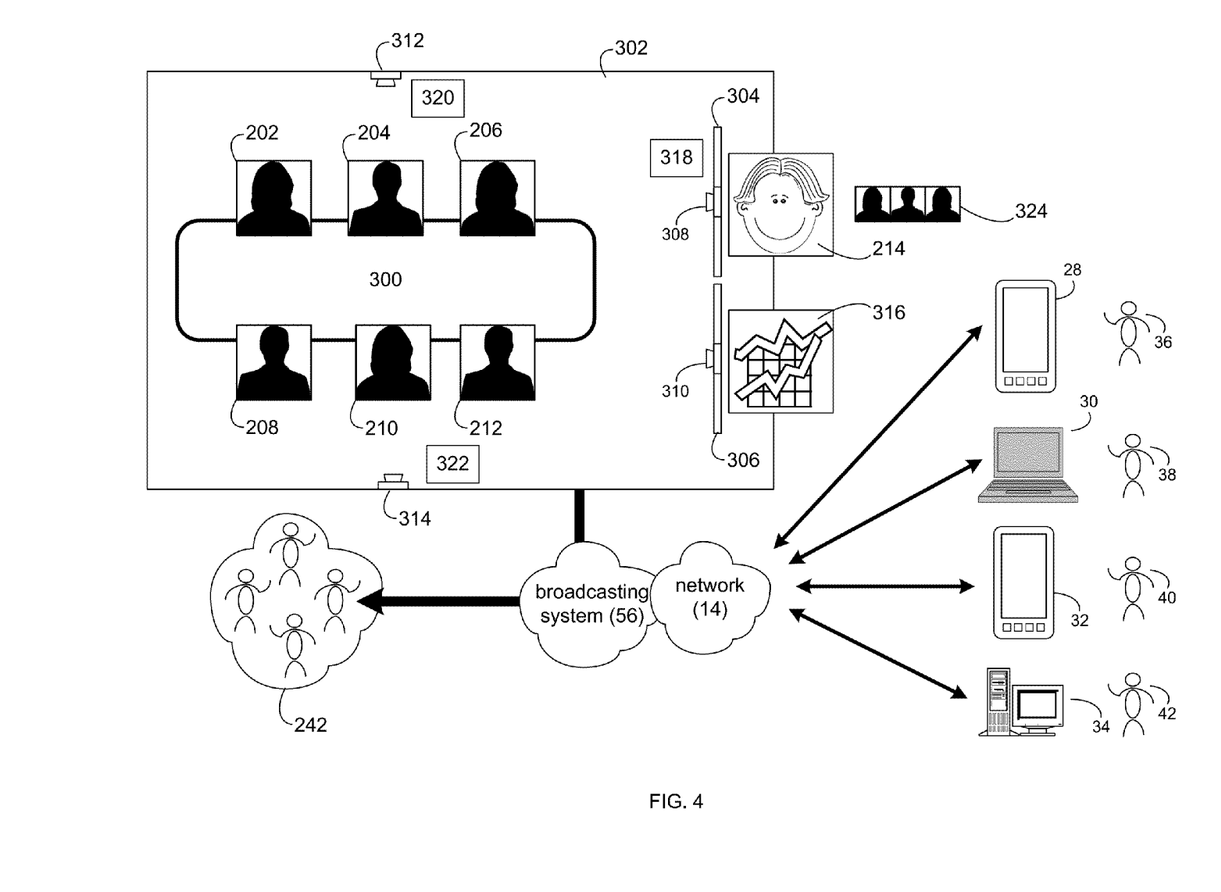
FIG. 4 is a diagrammatic view of a video conference effectuated by the synchronous communication process of FIG. 1 according to an embodiment of the present disclosure.

Referring also to FIG. 4, assume that users 202, 204, 206, 208, 210, 212 are all gathered around conference table 300 within conference room 302. Assume that conference room 302 includes two local video conference monitor (e.g., video conference monitors 304, 306), each of which may include a camera (e.g., cameras 308, 310; respectively). Each of video conference monitors 304, 306/cameras 308, 310 may be coupled to/interfaced with synchronous communication process 10 and, therefore, may be capable of receiving data from/providing data to synchronous communication process 10.

Further, assume that conference room 302 includes two additional cameras (e.g., cameras 312, 314). Each of cameras 312, 314 may be coupled to/interfaced with synchronous communication process 10 and, therefore, may be capable of providing data to synchronous communication process 10.

As discussed above and for this illustrative example, assume that user 36 utilizes synchronous communication process 10 to provide 100 synchronous communication session 200 to a plurality of users (e.g., users 36, 38, 40, 42, 202, 204, 206, 208, 210, 212).

While providing 100 synchronous communication session 200, synchronous communication process 10 may provide 102 a first video stream (e.g., video stream 214) associated with synchronous communication session 200 to a first imaging device associated with synchronous communication session 200. Examples of this first imaging device may include but are not limited to local video conference monitors (e.g., video conference monitor 304 and/or video conference monitor 306) and remote computing devices (e.g., data-enabled, cellular telephone 28, laptop computer 30, personal digital assistant 32, personal computer 34).

As discussed above, this first video stream (e.g., video stream 214) may be broadcast to broadcast recipients 242. Accordingly and through the use of synchronous communication process 10 and/or Internet-based broadcasting system 56, video stream 214 may be broadcast to the remote computing devices (not shown) utilized by broadcast recipients 242 so that they may experience synchronous communication session 200.

Synchronous communication process 10 may determine 104 a level of interest of the plurality of users (e.g., some or all of users 36, 38, 40, 42, 202, 204, 206, 208, 210, 212) in the first video stream (e.g., video stream 214) provided to the first imaging device (e.g., video conference monitor 304). In response to a low level of interest of the plurality of users (e.g., some or all of users 36, 38, 40, 42, 202, 204, 206, 208, 210, 212), synchronous communication process 10 may provide 106 a second video stream associated with synchronous communication session 200 to the first imaging device (e.g., video conference monitor 304) associated with synchronous communication session 200.

Continuing with the above-stated example, assume that user 36 is currently speaking within synchronous communication session 200. Accordingly, synchronous communication process 10 may provide 102 video stream 214 to video conference monitor 304. Synchronous communication process 10 may be configured to provide 108 at least one additional video stream (e.g., video graphic 316) associated with synchronous communication session 200 to at least one additional imaging device (e.g., video conference monitor 306) associated with synchronous communication session 200. Accordingly, synchronous communication process 10 may simultaneously provide 102, 108 video stream 214 & video graphic 316 to video conference monitors 304, 306 (respectively).

As discussed above, video conference monitor 304 may be positioned proximate camera 308 and video conference monitor 306 may be positioned proximate camera 310. When determining 104 a level of interest of the plurality of users (e.g., some or all of users 36, 38, 40, 42, 202, 204, 206, 208, 210, 212) in a video stream (e.g., video stream 214 and/or video graphic 316) provided to an imaging device (e.g., video conference monitor 304 and/or video conference monitor 306), synchronous communication process 10 may process 110 an image from the camera (e.g., camera 308 and/or camera 310) associated with the imaging device to determine whether a portion of the plurality of users are watching the video stream (e.g., video stream 214 and/or video graphic 316) provided to the imaging device (e.g., video conference monitor 304 and/or video conference monitor 306).

For example, assume that synchronous communication process 10 would like to determine 104 the level of interest that users 202, 204, 206, 208, 210, 212 (e.g., the users within conference room 300) have in video stream 214 provided to video conference monitor 304. Accordingly, synchronous communication process 10 may process 110 a first image (e.g., image 318) from camera 308 to determine the number/percentage of users 202, 204, 206, 208, 210, 212 who are watching video stream 214 provided to video conference monitor 304. When processing 110 image 318, synchronous communication process 10 may utilize standard computer vision methodologies (e.g., facial recognition) to determine which (if any) of users 202, 204, 206, 208, 210, 212 are looking at video conference monitor 304.

Accordingly, if user 202 is looking at video conference monitor 304 (i.e., watching video stream 214) and users 204, 206, 208, 210, 212 are not looking at video conference monitor 304 (i.e., are not watching video stream 214), synchronous communication process 10 may determine 104 a 16.67% level of interest in video stream 214.

Assume for illustrative purposes that synchronous communication session 200 considers a 16.67% level of interest to be a low level of interest. Accordingly, synchronous communication process 10 may provide 106 a second (different) video stream associated with synchronous communication session 200 to video conference monitor 304. However, synchronous communication session 200 may not know which other video stream to provide to video conference monitor 304. Specifically, while synchronous communication process 10 is aware that only user 202 is looking at video conference monitor 304, synchronous communication process 10 does not know where/what users 204, 206, 208, 210, 212 are looking at.

As discussed above, conference room 302 includes two additional cameras (e.g., cameras 312, 314). Each of cameras 312, 314 may be coupled to/interfaced with synchronous communication process 10 and, therefore, may be capable of providing data to synchronous communication process 10.

Accordingly, at least one additional camera (e.g., cameras 312, 314) may be positioned away from the first imaging device (e.g., video conference monitor 304). Further, when determining 104 the level of interest that users 202, 204, 206, 208, 210, 212 (e.g., the users within conference room 300) have in video stream 214 provided to video conference monitor 304, synchronous communication process 10 may process 112 at least one additional image (e.g., image 320, 322) from the at least one additional camera (e.g., cameras 312, 314; respectively) to determine whether a portion of the plurality of users are watching imagery proximate the at least one additional camera (e.g., cameras 312, 314).

For example, at least one additional imaging device (not shown) may be positioned proximate the at least one additional camera (e.g., cameras 312, 314), examples of which may include but are not limited to video conference monitors. In such a configuration, the imagery proximate cameras 312, 314 may include (in this example) two video streams that are provided 108 to and rendered upon the two imaging devices positioned proximate cameras 312, 314.

Alternatively, the at least one additional camera (e.g., cameras 312, 314) may be stand-alone cameras (i.e., not associated with/positioned proximate an imaging device) and may be positioned proximate one or more of the plurality of users. In such a configuration, the imagery proximate cameras 312, 314 may include (in this example) imagery associated with one or more of users 202, 204, 206, 208, 210, 212.

Assume for illustrative purposes that cameras 312, 314 are stand-alone cameras (i.e., not associated with/positioned proximate an imaging device) and are positioned proximate one or more of users 202, 204, 206, 208, 210, 212. Specifically, camera 312 is positioned proximate users 202, 204, 206 and camera 314 is positioned proximate users 208, 210, 212.

For example, assume that when synchronous communication process 10 processes 112 image 320, synchronous communication process 10 determines that user 208, 210, 212 are all looking into camera 312 (i.e., indicating that they are looking at one of users 202, 204, 206). Further, assume that when synchronous communication process 10 processes 112 image 322, synchronous communication process 10 determines that none of users 202, 204, 206 are looking into camera 314 (i.e., indicating that they are not looking at any of users 208, 210, 212). When processing 112 images 320, 322 communication process 10 may utilize standard computer vision methodologies (e.g., facial recognition) to determine which (if any) of users 202, 204, 206, 208, 210, 212 are looking into cameras 312, 314.

As discussed above, synchronous communication process 10 determined that user 202 is looking at video conference monitor 304. Accordingly, it is unclear as to what users 204, 206 are looking at (e.g., they may be looking at each other, looking at user 202, or looking at something else within conference room 300).

Therefore, since user 208, 210, 212 are all looking into camera 312 (i.e., indicating that they are looking at one of users 202, 204, 206), synchronous communication process 10 may provide 106 video stream 324 (provided by camera 314 and associated with synchronous communication session 200) to video conference monitor 304 (replacing video stream 214), as it appears that users 202, 204, 206, 208, 210, 212 show a 50.00% level of interest in video stream 324.

Video stream 324 may be broadcast to broadcast recipients 242. Accordingly and through the use of synchronous communication process 10 and/or Internet-based broadcasting system 56, video stream 324 may be broadcast to the remote computing devices (not shown) utilized by broadcast recipients 242 so that they may experience synchronous communication session 200.

While the above discussion concerns synchronous communication process 10 processing synchronous communication sessions that are occurring live, this is for illustrative purposes only and is not intended to be a limitation of this disclosure, as other configurations are possible. For example, synchronous communication process 10 may be configured so that it may perform post-processing on previously-recorded synchronous communication sessions. For example, during the occurrence of a synchronous communication session, all of the above-described video streams may be recorded by synchronous communication process 10 (and stored on e.g., storage device 16). Further, during the occurrence of the synchronous communication session, all of the above-described images generated by the above-described cameras may be recorded by synchronous communication process 10 (and also stored on e.g., storage device 16). Accordingly, these streams and images may subsequently be processed by synchronous communication process 10, thus effectuating (on a previously-recorded synchronous communication session) the functionality described above as being performed on a live synchronous communication session, wherein this subsequently-processed synchronous communication session may be broadcast to plurality of broadcast recipients 242.

Figure 5:
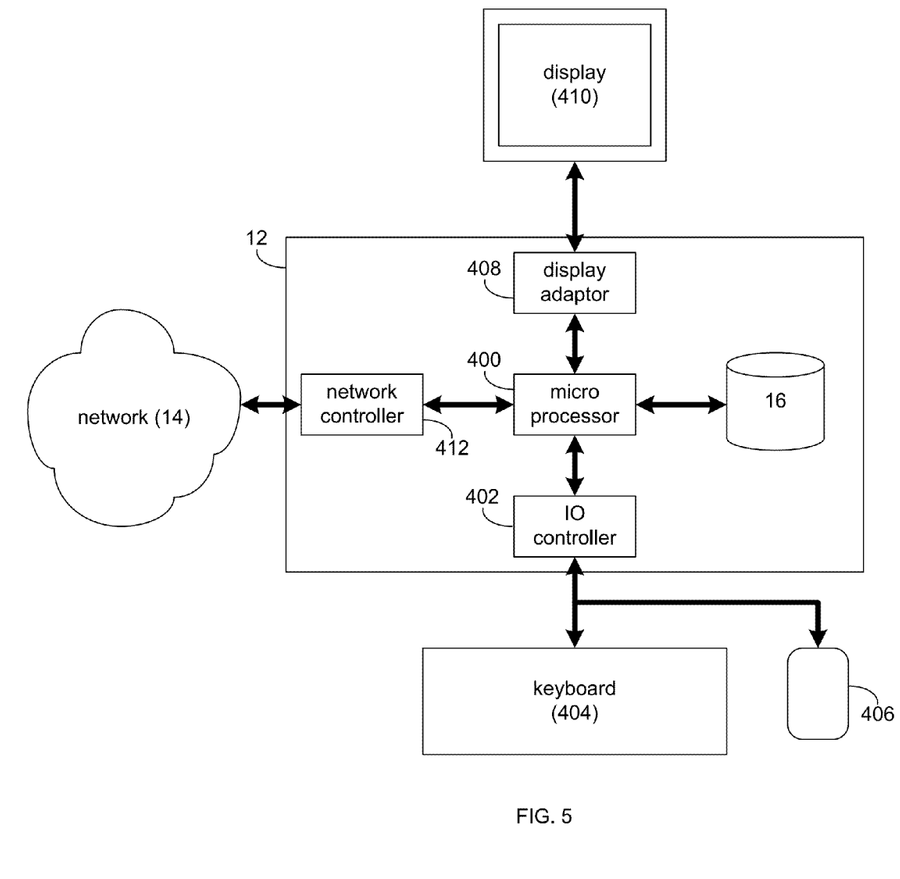
FIG. 5 is a diagrammatic view of the computing device of FIG. 1 according to an embodiment of the present disclosure.

Referring also to FIG. 5, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, synchronous communication process 10 may be substituted for computing device 12 within FIG. 5, examples of which may include but are not limited to client electronic devices 28, 30, 32, 34.

Computing system 12 may include microprocessor 400 configured to e.g., process data and execute instructions/code for synchronous communication process 10. Microprocessor 400 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 402 may be configured to couple microprocessor 400 with various devices, such as keyboard 404, mouse 406, USB ports (not shown), and printer ports (not shown). Display adaptor 408 may be configured to couple display 410 (e.g., a CRT or LCD monitor) with microprocessor 400, while network adapter 412 (e.g., an Ethernet adapter) may be configured to couple microprocessor 400 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 400) of a general purpose computer/special purpose computer/other programmable data processing apparatus (e.g., computing device 12), such that the instructions, which execute via the processor (e.g., processor 400) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having described the disclosure of the present application in detail and by reference to embodiments thereof, it will be apparent that modifications and variations are possible without departing from the scope of the disclosure defined in the appended claims.

What is claimed is:

1. A computer-implemented method comprising:
   providing, using one or more computing devices, a synchronous communication session for a plurality of users;
   providing a first video stream associated with the synchronous communication session to a first imaging device associated with the synchronous communication session, wherein the first imaging device is positioned proximate a first camera and at least one additional camera is positioned away from the first imaging device;
   determining a level of interest of the plurality of users in the first video stream provided to the first imaging device, including:
      processing a first image from the first camera to determine whether a portion of the plurality of users are watching the first video stream provided to the first imaging device, and
      processing at least one additional image from the at least one additional camera to determine whether a portion of the plurality of users are watching imagery proximate the at least one additional camera; and
   in response to a low level of interest of the plurality of users, providing a second video stream associated with the synchronous communication session to the first imaging device associated with the synchronous communication session.

2. The computer-implemented method of claim 1 wherein the first imaging device is a local video conference monitor.

3. The computer-implemented method of claim 1 wherein the first imaging device is a remote computing device.

4. The computer-implemented method of claim 3 wherein the first video stream and the second video stream are broadcast to the first imaging device.

5. The computer-implemented method of claim 1 further comprising:
   providing at least one additional video stream associated with the synchronous communication session to at least one additional imaging device associated with the synchronous communication session.

6. The computer-implemented method of claim 5 wherein the at least one additional camera is positioned proximate the at least one additional imaging device.

7. The computer-implemented method of claim 6 wherein the imagery proximate the at least one additional camera includes the at least one additional video stream provided to the at least one additional imaging device.

8. The computer-implemented method of claim 1 wherein the at least one additional camera is positioned proximate one or more of the plurality of users.

9. The computer-implemented method of claim 8 wherein the imagery proximate the at least one additional camera includes imagery associated with the one or more of the plurality of users.

10. A computing system including a processor and memory configured to perform operations comprising:
    providing, using one or more computing devices, a synchronous communication session for a plurality of users;
    providing a first video stream associated with the synchronous communication session to a first imaging device associated with the synchronous communication session, wherein the first imaging device is positioned proximate a first camera and at least one additional camera is positioned away from the first imaging device;
    determining a level of interest of the plurality of users in the first video stream provided to the first imaging device, including
       processing a first image from the first camera to determine whether a portion of the plurality of users are watching the first video stream provided to the first imaging device, and
       processing at least one additional image from the at least one additional camera to determine whether a portion of the plurality of users are watching imagery proximate the at least one additional camera; and
    in response to a low level of interest of the plurality of users, providing a second video stream associated with the synchronous communication session to the first imaging device associated with the synchronous communication session.

11. The computing system of claim 10 wherein the first imaging device is a local video conference monitor.

12. The computing system of claim 10 wherein the first imaging device is a remote computing device.

13. The computing system of claim 12 wherein the first video stream and the second video stream are broadcast to the first imaging device.

14. The computing system of claim 10 further configured to perform operations comprising:
    providing at least one additional video stream associated with the synchronous communication session to at least one additional imaging device associated with the synchronous communication session.

15. The computing system of claim 14 wherein the at least one additional camera is positioned proximate the at least one additional imaging device.

16. The computing system of claim 15 wherein the imagery proximate the at least one additional camera includes the at least one additional video stream provided to the at least one additional imaging device.

17. The computing system of claim 10 wherein the at least one additional camera is positioned proximate one or more of the plurality of users.

18. The computing system of claim 17 wherein the imagery proximate the at least one additional camera includes imagery associated with the one or more of the plurality of users.

19. A computer-implemented method comprising:
providing, using one or more computing devices, a synchronous communication session for a plurality of users;
providing a first video stream associated with the synchronous communication session to a first imaging device associated with the synchronous communication session;
determining a level of interest of the plurality of users in the first video stream provided to the first imaging device, including:
processing a first image from a first camera to determine whether a portion of the plurality of users are watching the first video stream provided to the first imaging device, and
processing at least one additional image from at least one additional camera to determine whether a portion of the plurality of users are not watching the first video stream provided to the first imaging device; and
in response to a low level of interest of the plurality of users, providing a second video stream associated with the synchronous communication session to the first imaging device associated with the synchronous communication session.

20. The computer-implemented method of claim 19 further comprising:
providing at least one additional video stream associated with the synchronous communication session to at least one additional imaging device associated with the synchronous communication session,
wherein determining the level of interest of the plurality of users in the first video stream provided to the first imaging device includes determining whether a portion of the plurality of users are watching the at least one additional video stream provided to the at least one additional imaging device.

21. The computer-implemented method of claim 19 further comprising:
providing the first video stream associated with the synchronous communication session to an additional imaging device associated with the synchronous communication session; and
in response to the low level of interest of the plurality of users, providing the second video stream associated with the synchronous communication session to the additional imaging device associated with the synchronous communication session.

22. The computer-implemented method of claim 1 further comprising:
providing the first video stream associated with the synchronous communication session to an additional imaging device associated with the synchronous communication session; and
in response to the low level of interest of the plurality of users, providing the second video stream associated with the synchronous communication session to the additional imaging device associated with the synchronous communication session.

23. The computing system of claim 10 further configured to perform operations comprising:
providing the first video stream associated with the synchronous communication session to an additional imaging device associated with the synchronous communication session; and
in response to the low level of interest of the plurality of users, providing the second video stream associated with the synchronous communication session to the additional imaging device associated with the synchronous communication session.

* * * * *